(12) United States Patent
Umeno

(10) Patent No.: US 7,886,362 B2
(45) Date of Patent: Feb. 8, 2011

(54) MEDIA AUTHENTICATION VIA PHYSICAL ATTRIBUTES OF A MEDIUM

(75) Inventor: Hiroo Umeno, Seattle, WA (US)

(73) Assignee: Micrsoft Corporation, Redmond, WA (US)

( * ) Notice: Subject to any disclaimer, the term of this patent is extended or adjusted under 35 U.S.C. 154(b) by 947 days.

(21) Appl. No.: 11/735,134

(22) Filed: Apr. 13, 2007

(65) Prior Publication Data

US 2008/0256597 A1 Oct. 16, 2008

(51) Int. Cl.
*H04K 1/00* (2006.01)
*H04L 9/00* (2006.01)

(52) U.S. Cl. .............................. 726/27; 726/2; 726/33; 726/32; 713/193

(58) Field of Classification Search .................... None
See application file for complete search history.

(56) References Cited

U.S. PATENT DOCUMENTS

| 6,104,679 | A | 8/2000 | Sollish | 369/33 |
|---|---|---|---|---|
| 6,636,689 | B1 | 10/2003 | Stebbings | 386/94 |
| 6,952,479 | B2 | 10/2005 | Shavit et al. | 380/201 |
| 6,987,718 | B2 | 1/2006 | Winter et al. | 369/53.2 |
| 7,102,973 | B1 * | 9/2006 | Carson | 369/53.21 |
| 2002/0118838 | A1 | 8/2002 | Belenko et al. | 380/277 |
| 2003/0081521 | A1 | 5/2003 | Solomon et al. | 369/53.21 |
| 2004/0174787 | A1 | 9/2004 | Carson | 369/53.21 |
| 2005/0108538 | A1 | 5/2005 | Howard et al. | 713/176 |
| 2005/0237887 | A1 | 10/2005 | Collar | 369/53.21 |

FOREIGN PATENT DOCUMENTS

| EP | 1 533 676 A1 | 5/2005 |
|---|---|---|
| WO | WO 99/60568 | 11/1999 |
| WO | WO 01/90860 A2 | 11/2001 |

OTHER PUBLICATIONS

Bloom, J.A. et al., "Copy Protection for DVD Video", *Proceedings of the IEEE, Special Issue on Identification and Protection of Multimedia Information*, 1999, 87, 7, 1267-1276.
Lin, E., "Video and Image Watermark Synchronization", *CERIAS Tech Report 2005-56*, May 2005, 234 pages.
"Media Authentication", ECD Systems: Media Authentication, ECD Systems, Raising your Security Expectations, http://www.ecdsystems.com/html/prod_armor_media.htm, Downloaded from Internet Feb. 21, 2007, 2 pages.

* cited by examiner

*Primary Examiner*—Nasser Moazzami
*Assistant Examiner*—Fikremariam Yalew
(74) *Attorney, Agent, or Firm*—Woodcock Washburn LLP

(57) ABSTRACT

An optical disc is authenticated by measuring physical attributes of the disc. A challenge is presented to the drive comprising the disc. The challenge includes locations on the disc to be used for authentication. The locations are determined each time the disc is to be authenticated. No restriction is placed on the locations on the medium, and no restriction is placed on the number of locations. Locations on the disc are accessed and an answer to the challenge is calculated in accordance with a physical attribute pertaining to the locations. The answer can include an angle between the locations, the physical separation between the locations, an amount of time elapsed between detection of the locations, an amount of time taken to read data between written between the locations, or a number of rotations occurring between detection of the locations. The answer is analyzed to determine the validity of the disc.

20 Claims, 7 Drawing Sheets

# MEDIA AUTHENTICATION VIA PHYSICAL ATTRIBUTES OF A MEDIUM

TECHNICAL FIELD

The technical field relates generally to computer processing and more specifically to computer processing security.

BACKGROUND

Current copy protection schemes for optical media, such as compact discs (CDs) and digital versatile discs (DVDs), rely on features of the media that are applied during the manufacturing process. The features help distinguish an authentic medium from a copy of the medium. For example, in accordance with a known protection scheme, optical media are generated with select sectors having improper error correction codes. This is used to detect a copied medium that have correct error correction codes for the selected sectors. This copy protection scheme however, can be defeated by copying an exact replica of the contents of the authentic medium.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A medium (e.g., CD, DVD) is authenticated by measuring physical attributes of the medium. The physical attributes can not be readily copied. The medium is authenticated to determine if the medium is authenticate (e.g., original) or if the medium is a copy. To authenticate a medium, a challenge is presented. The correct responses to the challenge utilize measurements of physical attributes of the medium. Measured attributes can include the physical separation between locations on a medium, an amount of time elapsed between detection of two locations, amount of time taken to read data between two locations, a number of rotations occurring between detection of two locations, or the like. No restriction is placed on the locations on the medium, and no restriction is placed on the number of locations. Locations are determined each time the medium is to be queried, thus essentially eliminating the possibility that the same locations will be used in consecutive queries.

BRIEF DESCRIPTION OF THE DRAWINGS

The foregoing summary, as well as the following detailed description, is better understood when read in conjunction with the appended drawings. For the purpose of illustrating media authentication via physical attributes of a medium, there is shown in the drawings exemplary constructions thereof; however, media authentication via physical attributes of a medium is not limited to the specific methods and instrumentalities disclosed.

DETAILED DESCRIPTION OF ILLUSTRATIVE EMBODIMENTS

In an example embodiment, a storage medium, such as an optical medium (e.g., CD, DVD), is authenticated to determine if the medium is a copy. A query is presented to the drive comprising the medium. The answer to the query is indicative of a physical attribute of the medium. A physical attribute can comprise any appropriate physical attribute, such as a radial displace of a data track on the storage medium, a vertical deviation of the storage medium, a spherical aberration of the storage medium, a pit density on the storage medium, or a combination thereof. A copyist copying the logical information from a disc will not copy the physical attributes of the disc. Further, no indication of the answer is stored on the storage medium. Thus, upon being queried, a copy of a disc will not be able to provide the correct response to the query.

For example, upon insertion of an optical disc into an optical disk drive, a query is provided containing two logical locations (e.g., sectors) on the optical disc. The query can be provided, for example, by a personal computer, game console, or the like. The disk drive, upon receipt of the query containing the two locations, utilizes an index to access the two locations on the disc. The response to the query is indicative of a physical attribute of the disc relating to the two locations. In an example embodiment, the response is indicative of a geometric relationship between the two locations, such as the angle between the two locations. The disc is generated (e.g., manufactured) such that the spacing between pits is not uniform throughout the entire disc. Typically, discs used for copy, that is the disc to which a copy is being written, has uniform pit density. Thus, the geometric relationship between locations on a disc having nonuniform pit density is different than the geometric relationship between respective locations on a disc having nonuniform pit density. No restriction is placed on where the locations (e.g., sectors) are located on the disc. No restriction is placed on the number of locations that can be selected to authenticate the disc. Utilization of the full length of the recorded medium allows a large number of potential queries making an attempts create of prospective answer tables impractical.

In an example embodiment, the storage medium comprises an optical disc for use with an online game service. The drive into which the disc is inserted comprises a game console and/or a general purpose processor. When the disc is inserted into the game console/processor, the disc is queried to determine if the disc is authentic or if the disc is a copy of another disc. The game console/processor analyzes the response to the query to determine if the disc is authentic. As described in below, the game console/processor can utilize an online game service to facilitate authentication of the disc.

Figure 1:
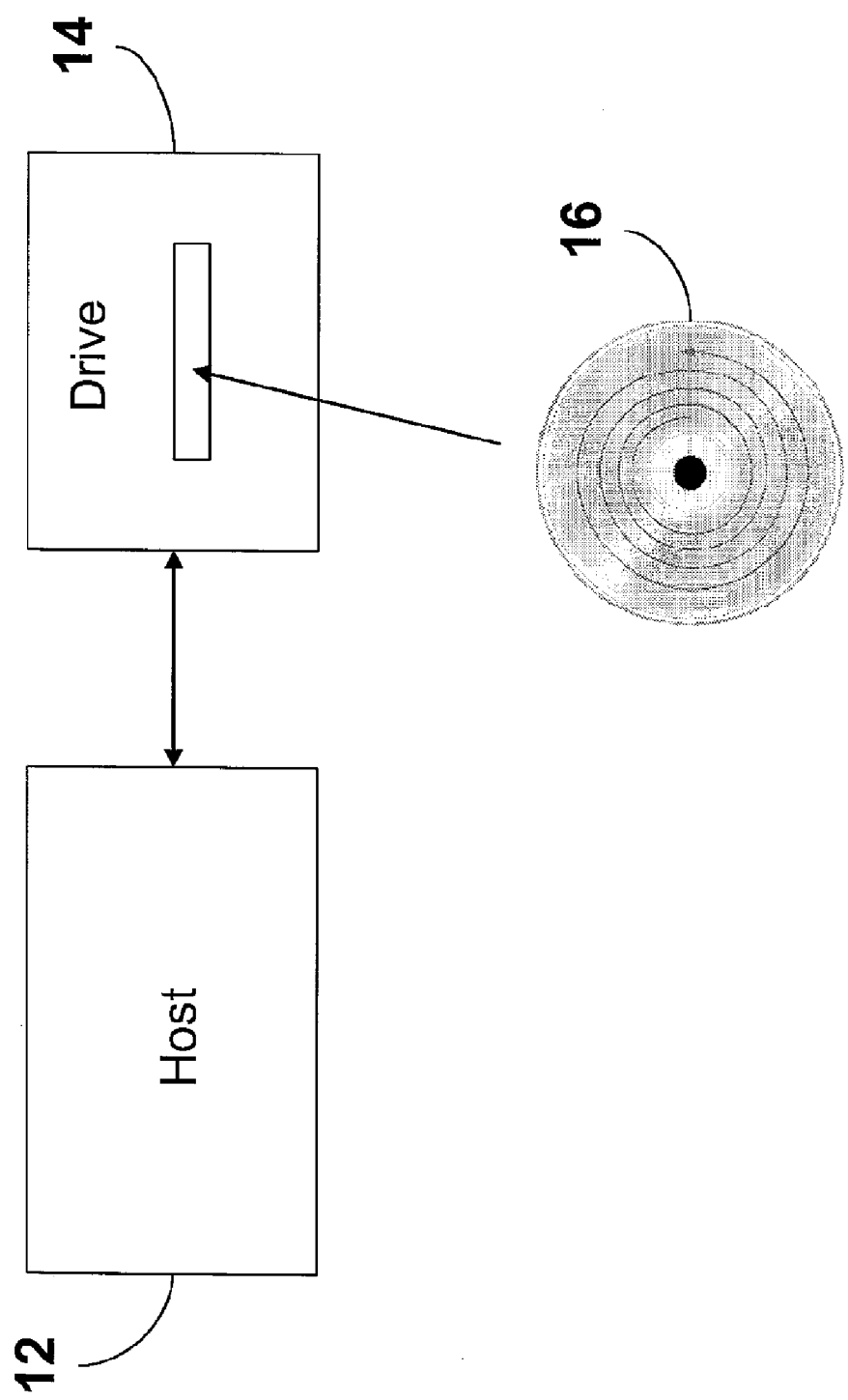
FIG. 1 is a block diagram of an example host processor, storage drive, and storage medium.

FIG. 1 is a block diagram of an example host processor 12, storage drive 14, and storage medium 16. The host processor 12 can comprise any appropriate processor that is configured to interface with a storage drive 14. An example host processor 12 includes, but is not limited to, a general purpose processor, a desk top computer, a server, a portable entertainment device, a portable media player, e.g., a portable music player, such as an MP3 player, a walkmans, etc., a portable computing device, such as a laptop, a personal digital assistant ("PDA"), a portable phone, such as a cell phone or the like, a smart phone, a video phone, a portable email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., a navigation device whether portable or installed in-vehicle, a non-conventional computing device, such as a kitchen appliance, a motor vehicle control (e.g., steering wheel), etc., or a combination thereof.

The storage drive 14 can comprise any appropriate storage drive configured to access the storage medium 16. Accessing the storage medium 16 includes reading information from the storage medium 16, writing information to the storage medium 16, erasing information from the storage medium 16, or a combination thereof. An example storage derive 14 can include, but is not limited to, a general purpose processor, a desk top computer, a server, a portable entertainment device, a portable media player, e.g., a portable music player, such as an MP3 player, a walkmans, etc., a portable computing device, such as a laptop, a personal digital assistant ("PDA"), a portable phone, such as a cell phone or the like, a smart phone, a video phone, a portable email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., a navigation device whether portable or installed in-vehicle, a non-conventional computing device, such as a kitchen appliance, a motor vehicle control (e.g., steering wheel), etc., or a combination thereof.

The host processor 12 and the storage drive 14 can be implemented in various configurations. In various example configurations, the host processor 12 and the storage drive 14 are the same processor, the host processor 12 and the storage drive 14 are separate processors, or a combination thereof. For example, the host processor 12 and the storage drive 14 can be implemented in a game console or in a personal computer.

Figure 2:
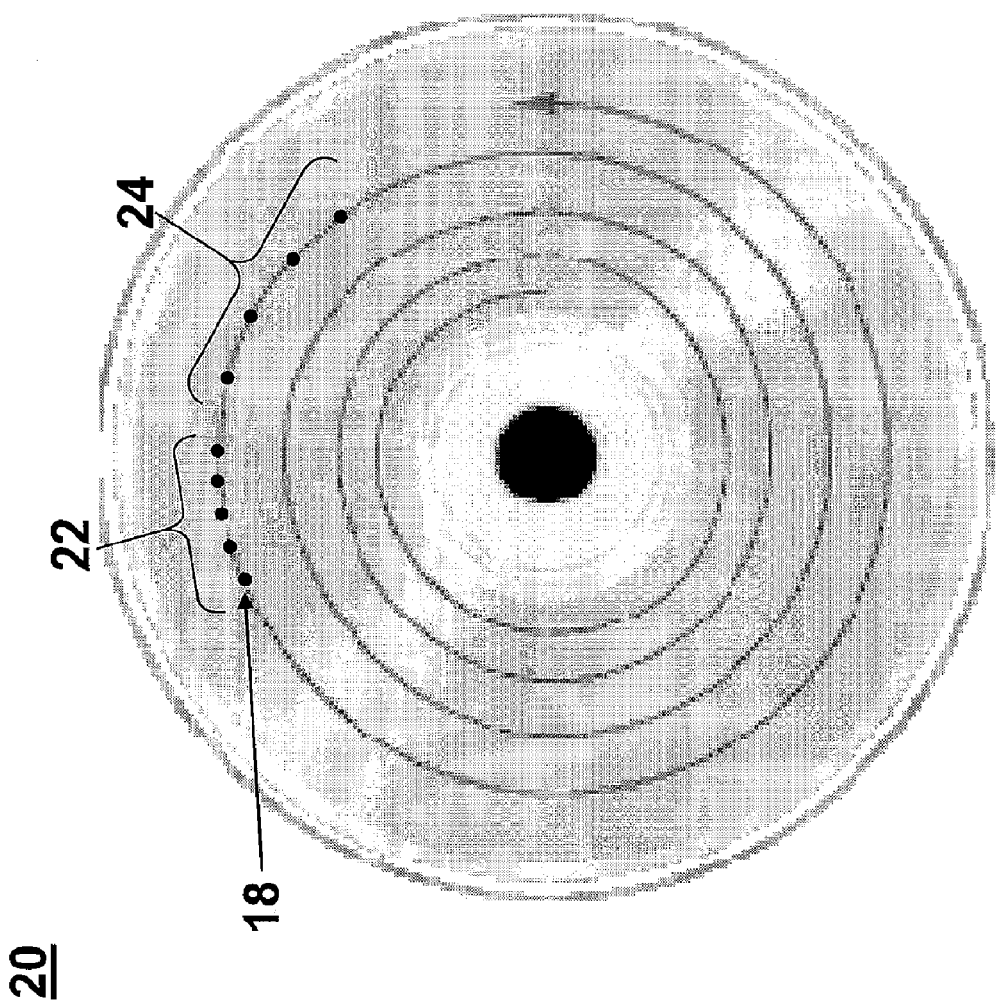
FIG. 2 is a depiction of an example storage medium.

FIG. 2 is a depiction of an example storage medium 20. The storage medium 20 can comprise any appropriate medium configured to store information. An example storage medium 20 can include, but is not limited to, an optical storage medium, such as a compact disc (CD), a digital versatile disc (DVD), a magnetic storage medium, a semiconductor storage medium, a charged coupled device (CCD) storage medium, or a combination thereof. As depicted in FIG. 2, information is stored on the storage medium 20 in the form of pits, wherein each pits represents a bit of information. A pit is represented in FIG. 2 as a dot, such as pit 18 for example. A pit can comprise a bump on an optical storage medium or a magnetic domain on a magnetic storage medium. In an example embodiment, the pit density is not uniform throughout the entire storage medium 20. As depicted in FIG. 2, the pit density of region 22 is greater than the pit density of region 24. Thus, the geometric relationship between two selected pits can vary depending upon the bit density. For example, the angle formed between two contiguous pits in region 22 is smaller than the angle formed between two contiguous pits in region 24. Thus, with a high probability, the geometric relationship between two pits on a storage medium having uniform pits density will differ from the geometric relationship between to respective pits on a storage medium having non-uniform pit density.

Figure 3:
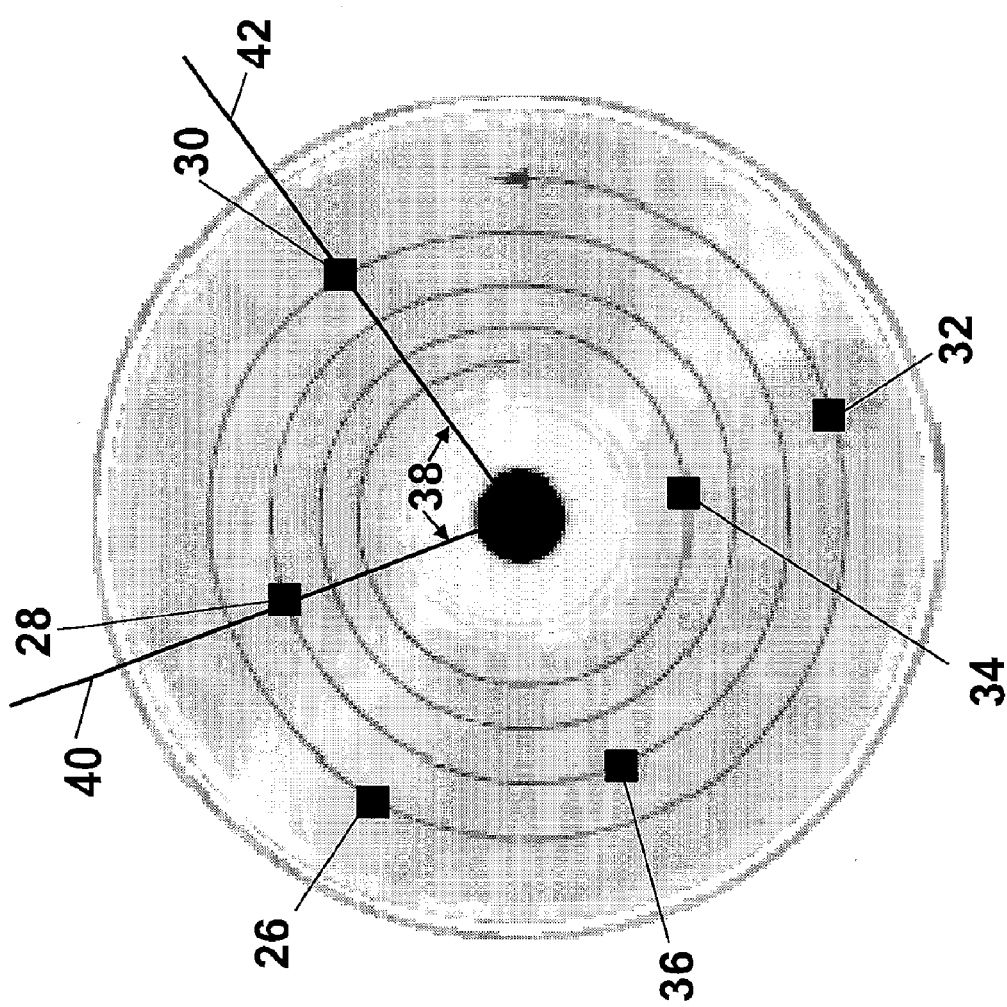
FIG. 3 is a depiction of example portions on a storage medium utilized to authenticate the storage medium.

FIG. 3 is a depiction of example portions on a storage medium utilized to authenticate the storage medium. To authenticate a storage medium, upon insertion of the storage medium into the storage drive, or any appropriate time thereafter, the host processor provides a query to the storage drive. In an example embodiment, the query includes two portions on the storage medium. Example portions 26, 28, 30, 32, 34, and 36 are depicted in FIG. 3. The portions can be located anywhere on the storage medium. No restrictions are imposed on the location of the portions on the storage medium. No restrictions are imposed on the number of portions that can be utilized.

In an example embodiment, the response to the query comprises an indication of a physical attribute of the storage medium. For example, the query can comprise an indication of portions 28 and 30. The response can comprise the angle 38 between the two portions 28 and 30. The response can comprise an indication of the physical separation (e.g., distance) between the portions 28 and 30. The response can comprise an amount of time elapsed between detection of the portion 30 and detection of the portion 28. The response can comprise an amount of time to read data starting at portion 30 and ending at portion 28. The response can comprise the number of rotations occurring between detection of the portion 30 and detection of the portion 28.

Upon receiving the response to the query, the host processor determines if the storage medium is valid by comparing the received response with an expected response. The host processor can obtain the expected answer from any appropriate source. For example, the host processor can obtain the expected answer from a database, a service, or a combination thereof. For example, if the host processor is a game console or a personal computer and the storage medium is a game disc, the host processor can obtain an expected response from a game service. And, the expected response from the game service is compared with the response received from the storage drive. If the received response matches the expected response, the storage medium is determined to be authentic. If the received response does not match the expected response, the storage medium is determined not to be authentic.

Figure 4:
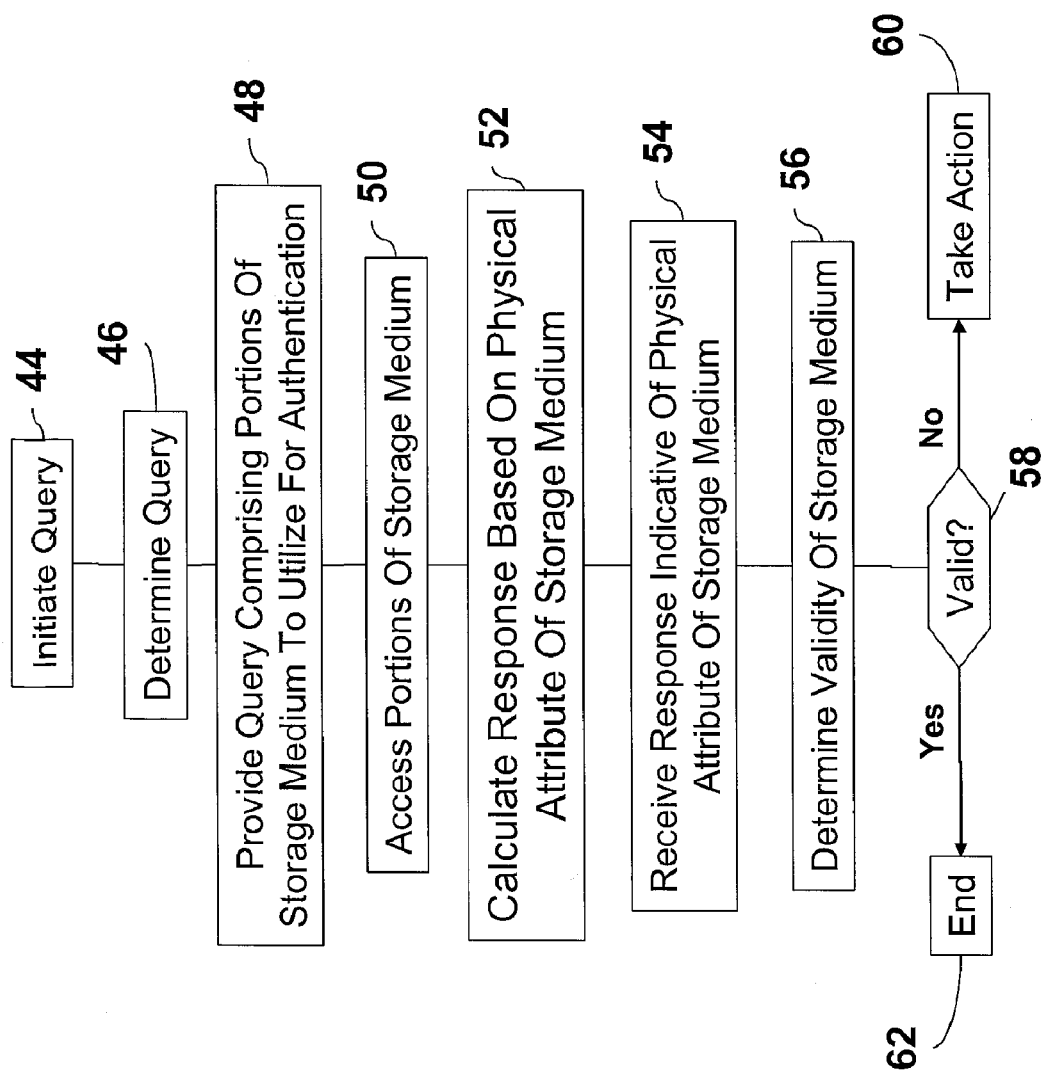
FIG. 4 is a flow diagram of an example process for authenticating a storage medium by measuring a physical attribute of the storage medium.

FIG. 4 is a flow diagram of an example process for authenticating a storage medium by measuring a physical attribute of the storage medium. A query to authenticate a storage medium is initiated at step 44. The query can be initiated upon insertion of the storage medium into a storage drive, the query can be initiated randomly, the query can be initiated periodically, the query can be initiated upon the occurrence of an event (e.g., start of a game session), or a combination thereof for example. For example, if the host processor is a game console or a personal computer and the storage medium is a game disc, a query can be initialized upon insertion of the game disc, upon registration with a game service, at random times as determined by the game service and/or the host processor, at period times as determined by the game service and/or the host processor, or a combination thereof. The query is determined at step 46. The query is determined each time the storage medium is to be authenticated. Determining the query comprises determining which portions of the storage medium to include in the query. The portions of the storage medium to include in the query can be randomly determined, predetermined, determined in response to an event (e.g., an indication to determine new portions), or a combination thereof. For example, the host processor can randomly determine the portions of the storage medium to include in the query each time a storage medium is to be authenticated. The host processor can periodically change the portions of the storage medium to include in the query. Or, the host processor can, upon receiving an indication from the service, such as a game service, can change the portions of the storage medium to include in the query.

At step 48, the query is provided to the drive comprising the storage medium. At step 50, the drive accesses the portions on the storage medium as provided in the query. At step 52, the drive calculates a response based on a physical attribute of the storage medium and the accessed portions. As described above, the response can include the angle between two portions on the storage medium, the physical separation between the portions on the storage medium, the amount of time elapsed between detection of two portions on the storage medium, the amount of time to read data between two portions on the storage medium, the number of rotations occurring between detection of two portions on the storage medium, or a combination thereof. The response is received by the host processor at step 54. The host processor determines the validity of the storage medium at step 56. As described above, the received response is compared to an expected response to determine the validity of the storage medium. It the storage medium is determined to be valid (step 58), the process ends at step 62. If the storage medium is determined not to be valid, appropriate action is taken at step 60. Appropriate action can include, for example, denying access to the storage medium, interfering with execution of the software on the storage medium, or a combination thereof. In an example embodiment in which the storage medium is a game disc comprising a game application, appropriate action can include halting game play, interfering with game play, or a combination thereof. In another example embodiment, in order to prevent a hacker or the like from obtaining the response by monitoring communications between the drive and the host processor, an amount of time is allowed to elapse before action is taken.

Figure 5:
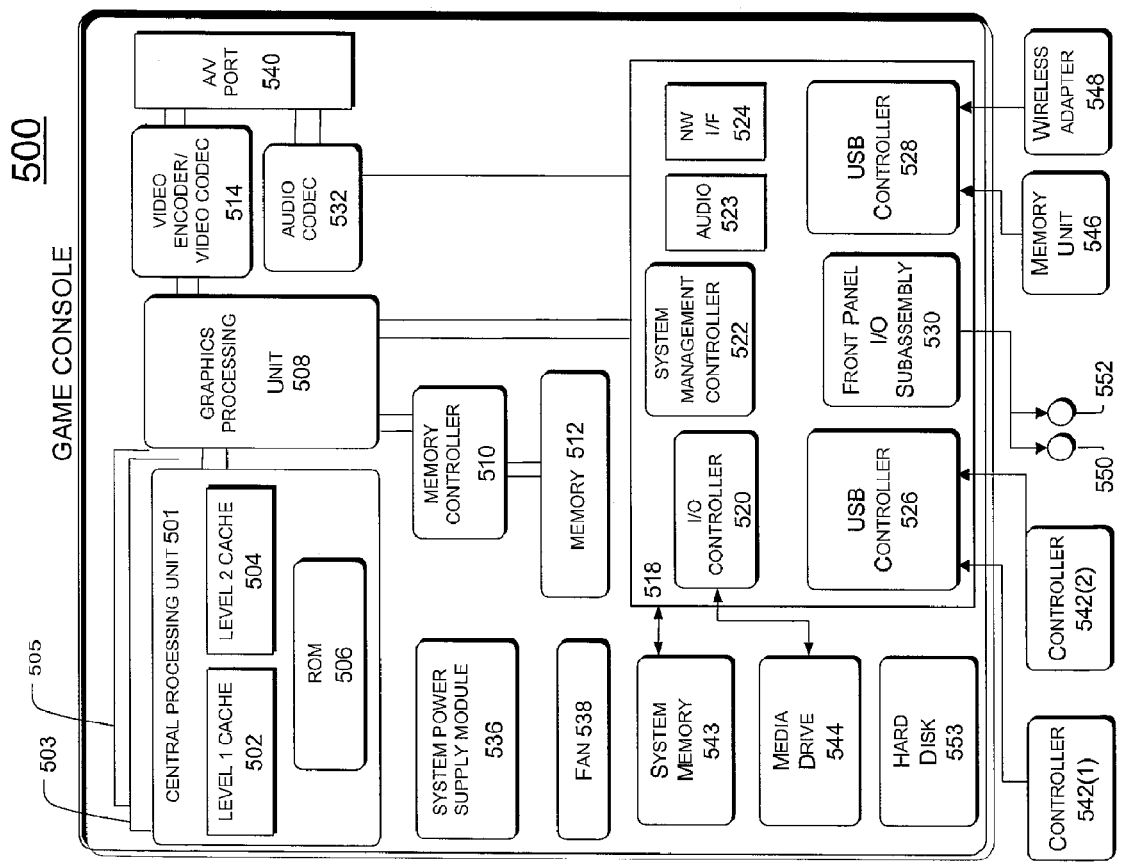
FIG. 5 is a block diagram of an example game console via which a storage medium can be authenticated in accordance with a physical attribute of the storage medium.

In an example scenario, the host processor comprises a game console. FIG. 5 is a block diagram of an example game console 500 via which a storage medium can be authenticated in accordance with a physical attribute of the storage medium. The game console 500 along with other devices described herein, such as a display device, are capable of performing the functions needed to accomplish media authentication via physical attributes of a medium, as describe above. Game console 500 is an example of a dedicated host system, although, as noted above, a game console is only one example of a dedicated host device. A typical game console comprises hardware and software that are specifically designed to support a core set of usage scenarios.

Game console 500 has a central processing unit (CPU) 501 having a level 1 (L1) cache 502, a level 2 (L2) cache 504, and a flash ROM (Read-only Memory) 506. The level 1 cache 502 and level 2 cache 504 temporarily store data and hence reduce the number of memory access cycles, thereby improving processing speed and throughput. The flash ROM 506 can store executable code that is loaded during an initial phase of a boot process when the game console 500 is initially powered. Alternatively, the executable code that is loaded during the initial boot phase can be stored in a FLASH memory device (not shown). Further, ROM 506 can be located separate from CPU 501. Game console 500 can, optionally, be a multi-processor system; for example game console 500 can have three processors 501, 503, and 505, where processors 503 and 505 have similar or identical components to processor 501.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display device. A memory controller 510 is connected to the GPU 508 and CPU 501 to facilitate processor access to various types of memory 512, such as, but not limited to, a RAM (Random Access Memory).

Game console 500 includes an I/O controller 520, a system management controller 522, an audio processing unit 523, a network interface controller 524, a first USB host controller 526, a second USB controller 528 and a front panel I/O subassembly 530 that may be implemented on a module 518. The USB controllers 526 and 528 serve as hosts for peripheral controllers 542(1)-842(2), a wireless adapter 548, and an external memory unit 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless interface components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the game console 500. When media drive 544 is a drive or reader for removable media (such as removable optical disks, or flash cartridges), then media drive 544 is an example of an interface onto which (or into which) media are mountable for reading. Application data may be accessed via the media drive 544 for execution, playback, etc. by game console 500. Media drive 544 is connected to the I/O controller 520 via a bus, such as a Serial ATA bus or other high speed connection (e.g., IEEE 5394). While media drive 544 may generally refer to various storage embodiments (e.g., hard disk, removable optical disk drive, etc.), game console 500 may specifically include a hard disk 552, which can be used to store game data, application data, or other types of data, and on which the file systems depicted in FIGS. 5 and 4 may be implemented.

The system management controller 522 provides a variety of service functions related to assuring availability of the game console 500. The audio processing unit 523 and an audio codec 532 form a corresponding audio processing pipeline with high fidelity, 5D, surround, and stereo audio processing according to aspects of the present subject matter described herein. Audio data is carried between the audio processing unit 523 and the audio codec 526 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the game console 500. A system power supply module 536 provides power to the components of the game console 500. A fan 538 cools the circuitry within the game console 500.

The CPU 501, GPU 508, memory controller 510, and various other components within the game console 500 are interconnected via one or more buses, including serial and parallel buses, a memory bus, a peripheral bus, and a processor or local bus using any of a variety of bus architectures.

When the game console 500 is powered on or rebooted, application data can be loaded from the system memory 543 into memory 512 and/or caches 502, 504 and executed on the CPU 501. The application can present a graphical user interface that provides a consistent user experience when navigating to different media types available on the game console 500. In operation, applications and/or other media contained within the media drive 544 may be launched or played from the media drive 544 to provide additional functionalities to the game console 500.

The game console 500 may be operated as a standalone system by simply connecting the system to a television or other display. In this standalone mode, the game console 500 may allow one or more users to interact with the system, watch movies, listen to music, and the like. However, with the integration of broadband connectivity made available through the network interface 524 or the wireless adapter 548, the game console 500 may further be operated as a participant in a larger network community.

Figure 6:
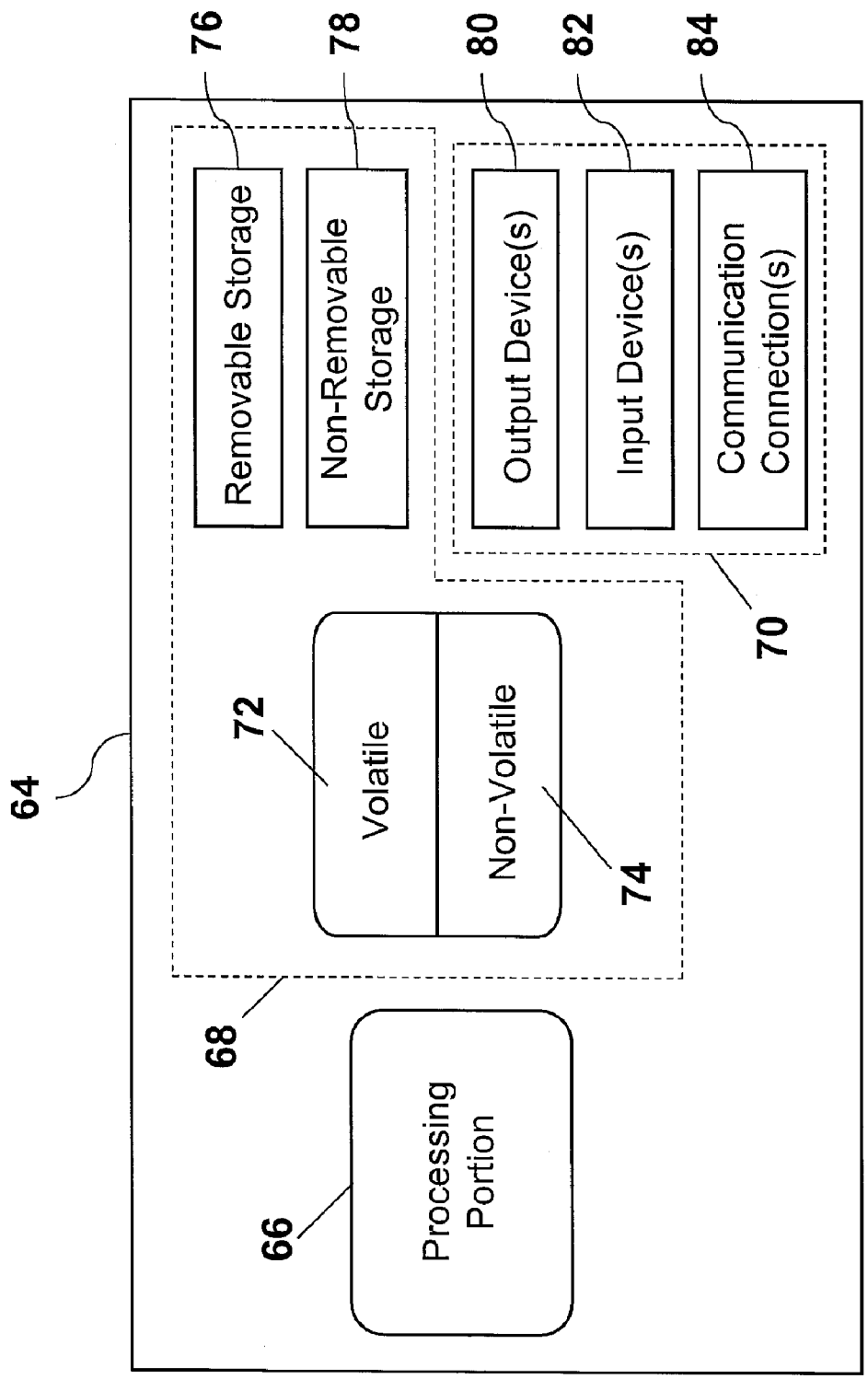
FIG. 6 is a diagram of an exemplary processor for implementing media authentication via physical attributes of a medium.

As described above, the host processor can comprise a processor or combination of processors. Also, the storage drive can comprise a processor or combination of processors. FIG. 6 is a diagram of an exemplary processor 64 for implementing media authentication via physical attributes of a medium. The processor 64 comprises a processing portion 66, a memory portion 68, and an input/output portion 70. The processing portion 66, memory portion 68, and input/output portion 70 are coupled together (coupling not shown in FIG. 6) to allow communications therebetween. The input/output portion 70 is capable of providing and/or receiving components utilized to perform media authentication via physical attributes of a medium as described above. For example, the input/output portion 70 is capable of, as described above, providing a query and receiving a response thereto.

The processing portion 66 is capable of media authentication via physical attributes of a medium as described above. For example, the processing portion 66 is capable of determining a query, accessing portions of the storage medium, calculating an answer, determining the validity of the storage medium, taking action, or a combination thereof.

The processor 64 can be implemented as a client processor and/or a server processor. In a basic configuration, the processor 64 can include at least one processing portion 66 and memory portion 68. The memory portion 68 can store any information utilized in conjunction with media authentication via physical attributes of a medium. Depending upon the exact configuration and type of processor, the memory portion 68 can be volatile (such as RAM) 72, non-volatile (such as ROM, flash memory, etc.) 74, or a combination thereof. The processor 64 can have additional features/functionality. For example, the processor 64 can include additional storage (removable storage 76 and/or non-removable storage 78) including, but not limited to, magnetic or optical disks, tape, flash, smart cards or a combination thereof. Computer storage media, such as memory portion 68, 72, 74, 76, and 78, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 64. Any such computer storage media can be part of the processor 64.

The processor 64 can also contain communications connection(s) 84 that allow the processor 64 to communicate with other devices, such as other devices, for example. Communications connection(s) 84 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 64 also can have input device(s) 82 such as keyboard, mouse, pen, voice input device, touch input device, etc. Output device(s) 80 such as a display, speakers, printer, etc. also can be included.

Figure 7:
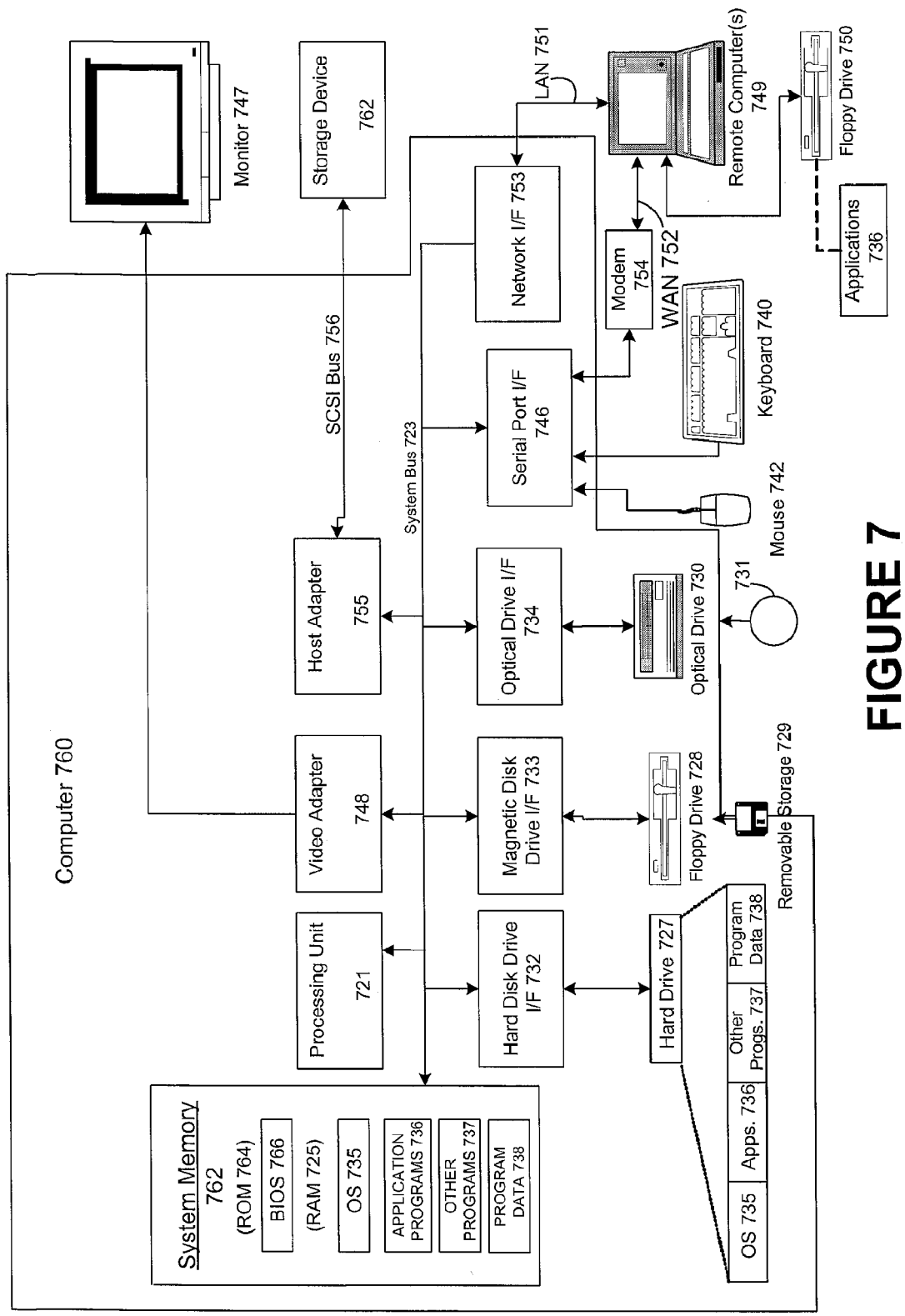
FIG. 7 is a depiction of a suitable computing environment in which media authentication via physical attributes of a medium can be implemented.

FIG. 7 and the following discussion provide a brief general description of a suitable computing environment in which media authentication via physical attributes of a medium can be implemented. Although not required, various aspects of media authentication via physical attributes of a medium can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of media authentication via physical attributes of a medium can be practiced with other computer system configurations, including hand held devices, multi processor systems, microprocessor based or programmable consumer electronics, network PCs, minicomputers, mainframe computers, and the like. Further, media authentication via physical attributes of a medium also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with media authentication via physical attributes of a medium as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 7, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 7 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 7. The logical connections depicted in FIG. 7 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of media authentication via physical attributes of a medium are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for media authentication via physical attributes of a medium, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing media authentication via physical attributes of a medium.

The program(s) can be implemented in assembly or machine language, if desired. In any case, the language can be a compiled or interpreted language, and combined with hardware implementations. The methods and apparatuses for implementing media authentication via physical attributes of a medium also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of media authentication via physical attributes of a medium. Additionally, any storage techniques used in connection with media authentication via physical attributes of a medium can invariably be a combination of hardware and software.

While media authentication via physical attributes of a medium has been described in connection with the example embodiments of the various figures, it is to be understood that other similar embodiments can be used or modifications and additions can be made to the described embodiments for performing the same functions of media authentication via physical attributes of a medium without deviating therefrom. Therefore, media authentication via physical attributes of a medium as described herein should not be limited to any single embodiment, but rather should be construed in breadth and scope in accordance with the appended claims.

What is claimed is:

1. A method for authenticating a storage medium having a plurality of different logical locations used to determine physical attributes of the storage medium, the method comprising:
   determining a query for authenticating the storage medium, wherein determining the query comprises randomly selecting at least two locations among the plurality of different logical locations;
   providing the query, wherein the query specifies the at least two randomly selected locations;
   receiving an answer to the query, wherein:
      the answer is indicative of at least one physical attribute of the storage medium, wherein the at least one physical attribute comprises a physical relationship relating to the at least two randomly selected locations; and
      no restriction is imposed on a location on the storage medium of the physical attribute; and
   determining if the storage medium is authentic in accordance with the received answer.

2. A method in accordance with claim 1, wherein:
   the at least two randomly selected locations comprise an indication of a first portion of the storage medium and an indication of a second portion of the storage medium; and
   the answer comprises an indication of a geometrical relationship between the first portion and the second portion.

3. A method in accordance with claim 2, the method further comprising:
   periodically repeating the steps in claim 1, wherein periodically means upon each of a plurality of events, a plurality of random occasions or a combination thereof.

4. A method in accordance with claim 2, wherein the answer comprises an angle between the first portion and the second portion.

5. A method in accordance with claim 2, wherein the first portion and the second portion are at least one of:
   randomly determined; and
   determined in response to receipt of an indication to determine the first portion and the second portion.

6. A method in accordance with claim 1, further comprising, if the storage medium is determined to not be authentic, performing at least one of denying access to the storage medium and providing an indication that the storage medium is not authentic.

7. A method in accordance with claim 6, further comprising evading detection of the answer by allowing a period of time to elapse after the determination whether the storage medium is authentic before performing at least one of denying access to the storage medium and providing an indication that the storage medium is not authentic.

8. A method in accordance with claim 1, wherein the storage medium comprises an optical storage medium.

9. A method in accordance with claim 1, wherein:
   the at least two randomly selected locations comprise an indication of a first portion of the storage medium and an indication of a second portion of the storage medium; and
   the answer comprises at least one of:
      a physical separation between the first portion and the second portion;
      an amount of time elapsed between detection of the first portion and detection of the second portion;
      an amount of time to read data starting at the first portion and ending at the second portion; and
      a number of rotations occurring between detection of the first portion and detection of the second portion.

10. A method in accordance with claim 1, wherein no indication of the answer is stored on the storage medium.

11. A storage medium authentication system comprising:
   an input/output portion configured to:
      provide a query for authenticating the storage medium, wherein the storage medium has a plurality of different logical locations used to determine physical attributes of the storage medium; and
      receive an answer to the query, wherein:

the answer is indicative of a physical attribute of the storage medium; and no restriction is imposed on a location on the storage medium of the physical attribute; and a processing portion configured to periodically query the storage medium, wherein the query specifies at least two randomly selected locations among the plurality of different logical locations, and periodically determine if the storage medium is authentic in accordance with the received answer to each periodic query, wherein periodically means upon each of a plurality of events, a plurality of random occasions, or a combination thereof.

12. A system in accordance with claim 11, wherein:

each query comprises an indication of a first portion of the storage medium and an indication of a second portion of the storage medium; and the answer comprises an indication of a geometrical relationship between the first portion and the second portion.

13. A system in accordance with claim 12, wherein:

the first portion comprises a first logical location on the storage medium; and the second portion comprises a second logical location on the storage medium.

14. A system in accordance with claim 12, wherein the first portion and the second portion are at least one of:

randomly determined; and determined in response to receipt of an indication to determine the first portion and the second portion.

15. A system in accordance with claim 11, the processing portion further configured to, if the storage medium is determined to not be authentic, performing at least one of denying access to the storage medium and providing an indication that the storage medium is not authentic.

16. A system in accordance with claim 12, further comprising evading detection of the answer by allowing a period of time to elapse after the determination whether the storage medium is authentic before performing at least one of denying access to the storage medium and providing an indication that the storage medium is not authentic.

17. A system in accordance with claim 11, wherein the storage medium comprises an optical storage medium.

18. A system in accordance with claim 11, wherein:

the query comprises an indication of a first portion of the storage medium and an indication of a second portion of the storage medium; and the answer comprises at least one of:

a physical separation between the first portion and the second portion;

an amount of time elapsed between detection of the first portion and detection of the second portion;

an amount of time to read data starting at the first portion and ending at the second portion;

a number of rotations occurring between detection of the first portion and detection of the second portion; and an angle between the first portion and the second portion.

19. A system in accordance with claim 11, wherein no indication of the answer is stored on the storage medium.

20. A computer-readable storage medium, wherein the computer-readable storage medium is not a signal, the computer-readable storage medium having stored thereon computer-executable instructions for authenticating a storage medium having a plurality of different logical locations used to determine physical attributes of the storage medium by performing the steps of:

determining a query for authenticating the storage medium, wherein determining the query comprises randomly selecting at least two locations among the plurality of different logical locations;

providing the query, wherein the query specifies the at least two randomly selected locations;

receiving an answer to the query, wherein:

the answer is indicative of at least one physical attribute of the storage medium, wherein the at least one physical attribute comprises at least one of irregular:

radial displacement, vertical deviation, spherical aberration and logical bit density; and no restriction is imposed on a location on the storage medium of the physical attribute; and determining if the storage medium is authentic in accordance with the received answer.

* * * * *